(12) United States Patent
Chen

(10) Patent No.: US 11,556,801 B2
(45) Date of Patent: Jan. 17, 2023

(54) NEURAL NETWORK IMAGE IDENTIFICATION SYSTEM, NEURAL NETWORK BUILDING SYSTEM AND METHOD

(71) Applicant: VIA Technologies, Inc., Taipei (TW)

(72) Inventor: Chunwen Chen, Taipei (TW)

(73) Assignee: VIA TECHNOLOGIES, INC., Taipei (TW)

( * ) Notice: Subject to any disclaimer, the term of this patent is extended or adjusted under 35 U.S.C. 154(b) by 407 days.

(21) Appl. No.: 16/865,471

(22) Filed: May 4, 2020

(65) Prior Publication Data

US 2021/0056433 A1  Feb. 25, 2021

Related U.S. Application Data

(60) Provisional application No. 62/888,588, filed on Aug. 19, 2019.

(30) Foreign Application Priority Data

Jan. 17, 2020 (TW) .................................. 109101742

(51) Int. Cl.
*G06N 3/10* (2006.01)
*G06F 8/34* (2018.01)

(52) U.S. Cl.
CPC .............. *G06N 3/105* (2013.01); *G06F 8/34* (2013.01)

(58) Field of Classification Search
CPC ....................................................... G06F 8/34
(Continued)

(56) References Cited

U.S. PATENT DOCUMENTS 5,623,664 A * 4/1997 Calvert ................. G06F 9/5016
713/1
9,443,192 B1 * 9/2016 Cosic ...................... G06N 5/048
(Continued)

FOREIGN PATENT DOCUMENTS

CN       105511860 A    4/2016
CN       105930855 A    9/2016

*Primary Examiner* — Chat C Do
*Assistant Examiner* — Bradford F Wheaton
(74) *Attorney, Agent, or Firm* — McClure, Qualey & Rodack, LLP

(57) ABSTRACT

The present disclosure relates to a neural network image identification system and a neural network building system and method used therein. The neural network building method comprises: forming a combination sequence of instruction graphic tags according to a plurality of instruction graphic tags selected by a user and displayed on a screen; combining a plurality of program sets corresponding to the plurality of instruction graphic tags in an order identical to that of contents in the combination sequence of these instruction graphic tags, to generate a neural network program; and checking whether the combination sequence of instruction graphic tags conforms to one or more preset rules before the neural network program is compiled. Therefore, the neural network image identification system is configured to identify an image to be identified captured by an image capturing device, while the neural network image identification program for identifying images by the neural network image identification system can be built by the neural network building system in accordance with needs of users.

11 Claims, 7 Drawing Sheets

(58) Field of Classification Search
USPC .......................................................... 706/15
See application file for complete search history.

(56) References Cited

U.S. PATENT DOCUMENTS

| | | | | |
|---|---|---|---|---|
| 10,185,895 | B1* | 1/2019 | Tse | G06V 10/764 |
| 2010/0082803 | A1* | 4/2010 | Nguyen | G06Q 10/20 |
| | | | | 705/305 |
| 2015/0100762 | A1* | 4/2015 | Jacobs | G06F 12/0875 |
| | | | | 712/207 |
| 2019/0340763 | A1* | 11/2019 | Laserson | G06N 3/0454 |
| 2020/0285916 | A1* | 9/2020 | Wang | G06V 10/40 |
| 2020/0401853 | A1* | 12/2020 | Xiong | G06V 40/10 |
| 2021/0019591 | A1* | 1/2021 | Venkatesh | G06N 3/08 |
| 2021/0385370 | A1* | 12/2021 | Kang | G06V 10/82 |

\* cited by examiner

```
input_shape = (48, 48, 3)
model.add(Flatten(input_shape=input_shape))
model.add(Dense(units=128, activation="relu"))
model.add(Dense(units=128, activation="relu"))
model.add(Dense(units=4, activation="SoftMax")) # OUTPUT
```

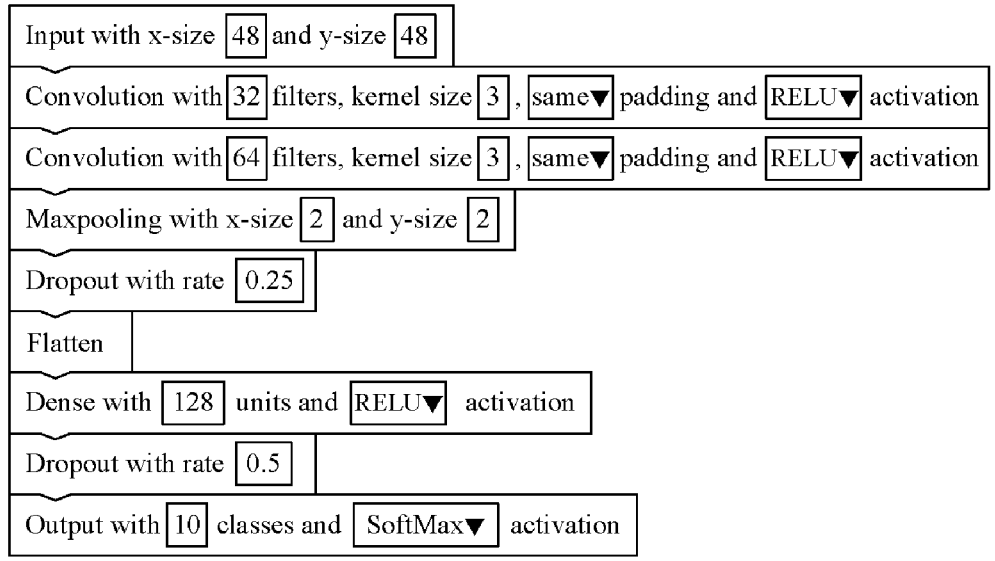

Fig. 4A

```
input_shape = (48, 48, 3)
model.add(Conv2D(filters=32, kernel_size=3, padding="same", activation="relu", input_shape=input_shape))
model.add(Conv2D(filters=64, kernel_size=3, padding="same", activation="relu"))
model.add(MaxPooling2D(pool_size=(2, 2)))
model.add(Dropout(0.25))
model.add(Flatten())
model.add(Dense(units=128, activation="relu"))
model.add(Dropout(0.5))
model.add(Dense(units=10, activation="SoftMax")) # OUTPUT
```

Fig. 4B

NEURAL NETWORK IMAGE IDENTIFICATION SYSTEM, NEURAL NETWORK BUILDING SYSTEM AND METHOD

CROSS-REFERENCE TO RELATED APPLICATIONS

This application claims the priority benefit of U.S. provisional application Ser. No. 62/888,588, filed on Aug. 19, 2019, and also the priority benefit of Taiwan application serial no. 109101742, filed on Jan. 17, 2020. The entirety of the above-mentioned patent applications is hereby incorporated by reference herein and made a part of this specification.

TECHNICAL FIELD

The disclosure relates to a neural network system, in particular to a neural network image identification system and a neural network building system and method used by the same.

BACKGROUND

Due to the high development of processor technologies, users only need to write an appropriate software program, and then the processor can be used to run the software program so as to realize an effect of automating the operations easily. However, before the appropriate software program can be written and the processor can be driven for automating the operations, the user must get familiar with the programming language suitable for driving the processor. This learning procedure considerably extends the time cost for a beginner to actually finish a job. Taking neural network training as an example, in the case that user-customized functions are provided by the product, as the user may not understand the programming language used in the product, he/she may only be allowed to make some adjustments among various preset parameters, while the purpose of building new functions via the user in the product cannot be achieved.

SUMMARY

In view of this, the present disclosure provides a neural network image identification system and a neural network building system and method used therein, which provide simple use interfaces to help users easily finish the building of the neural network.

In one aspect, the present disclosure provides a neural network image identification system, including an image capturing device, an image identification device, and a neural network building system. The image capturing device is adapted to capture an image to be identified; the image identification device is electrically coupled to the image capturing device and configured to obtain the image to be identified from the image capturing device, and the image identification device is further configured to execute a neural network image identification program to identify the image to be identified to obtain a result of identification. The neural network building system includes an input unit, a display unit, and a control unit; the display unit is adapted to provide a screen where a plurality of instruction graphic tags can be displayed; the input unit is adapted for a user to input a controlling operation to select the instruction graphic tags, in order to form a combination sequence of instruction graphic tags; the control unit is configured to provide a plurality of program sets related to a plurality of neural network layers, with each instruction graphic tag corresponding to one program set. The neural network building system is configured to combine, in an order identical to that of the contents of the combination sequence of instruction graphic tags, program sets corresponding to these instruction graphic tags to generate the neural network image identification program; and the neural network building system is configured to check whether the combination sequence of instruction graphic tags conforms with one or more preset rules before the neural network image identification program is compiled.

In one embodiment, the controlling operation include setting a parameter field in a functional content graph corresponding to an instruction graphic tag to set a parameter used by a program set corresponding to the instruction graphic tag.

In one embodiment, the one or more preset rules are used to check whether a matching relationship between the program sets corresponding to the instruction graphic tags in the combination sequence of instruction graphic tags is appropriate.

In one embodiment, the instruction graphic tag includes an input layer instruction graphic tag, a flatten layer instruction graphic tag, and an output layer instruction graphic tag, with the input layer instruction graphic tag corresponding to an input layer program set, and the flatten layer instruction graphic tag corresponding to a flatten layer program set, and the output layer instruction graphic tag corresponding to an output layer program set, wherein the input layer program set is adapted to execute an input layer of the neural network image identification program, the flatten layer program set is adapted to execute a flatten layer of the neural network image identification program, and the output layer program set is adapted to execute an output layer of the neural network image identification program. The preset rules include: if a dimension of an input tensor of the input layer instruction graphic tag is higher than a dimension of an output tensor of the output layer instruction graphic tag, then the combination sequence of instruction graphic tags must include at least one functional content graph of the flatten layer instruction graphic tag.

In one embodiment, the instruction graphic tags include an input layer instruction graphic tag, a flatten layer instruction graphic tag, and a fully connected layer instruction graphic tag, with the input layer instruction graphic tag corresponding to an input layer program set, and the flatten layer instruction graphic tag corresponding to a flatten layer program set, and the fully connected layer instruction graphic tag corresponding to a fully connected layer program set, wherein the input layer program set is adapted to execute an input layer of the neural network image identification program, the flatten layer program set is adapted to execute a flatten layer of the neural network image identification program, and the fully connected layer program set is adapted to execute a fully connected layer of the neural network image identification program. The preset rules include: if a dimension of an input tensor of the input layer instruction graphic tag is higher than 1, then the functional content graph of the fully connected layer instruction graphic tag must be arranged after the functional content graph of the flatten layer instruction graphic tag.

In one embodiment, if the controlling operation to adjust the contents of the combination sequence of instruction graphic tags violates the preset rules, the neural network building system generates a warning signal and restores the contents of the combination sequence of instruction graphic tags back to the contents of the combination sequence of instruction graphic tags before the execution of the controlling operation.

In one embodiment, when the neural network building system has finished the check with the preset rules, the neural network image identification system transmits the neural network image identification program to an external server for compilation, and transmits an existing image including the target object to be identified to the external server for training the neural network image identification program, wherein the external server provides a reference image that does not include the target object for training the neural network image identification program. After the training is finished, the neural network image identification program is transmitted back to the neural network image identification system for identifying the image to be identified.

In another aspect, the present disclosure provides a neural network building system, including an input unit, a display unit, and a control unit. The display unit is adapted to provide a screen where a plurality of instruction graphic tags can be displayed; the input unit is adapted for a user to input a controlling operation to select the instruction graphic tags, in order to form a combination sequence of instruction graphic tags; the control unit is configured to provide a plurality of program sets related to a plurality of neural network layers, with each instruction graphic tag corresponding to one program set. The neural network building system is configured to combine, in an order identical to that of the contents of the combination sequence of instruction graphic tags, program sets corresponding to these instruction graphic tags to generate a neural network program; and the neural network building system is configured to check whether the combination sequence of instruction graphic tags conforms with one or more preset rules before the neural network program is compiled.

In a further aspect, the present disclosure provides a neural network building method, comprising the following steps: forming a combination sequence of instruction graphic tags according to a plurality of instruction graphic tags selected by a user and displayed on a screen; combining a plurality of program sets corresponding to the instruction graphic tags in an order identical to that of the contents of the combination sequence of these instruction graphic tags, to generate a neural network program; and checking whether the combination sequence of instruction graphic tags conforms to one or more preset rules before the neural network program is compiled.

In one embodiment, the neural network building method further comprises: setting a parameter used by a program set corresponding to an instruction graphic tag according to a parameter field set by a user in a functional content graph corresponding to the instruction graphic tag.

In one embodiment, the instruction graphic tag includes an input layer instruction graphic tag, a flatten layer instruction graphic tag, and an output layer instruction graphic tag, with the input layer instruction graphic tag corresponding to an input layer program set, and the flatten layer instruction graphic tag corresponding to a flatten layer program set, and the output layer instruction graphic tag corresponding to an output layer program set, wherein the input layer program set is adapted to execute an input layer of the neural network image identification program, the flatten layer program set is adapted to execute a flatten layer of the neural network image identification program, and the output layer program set is adapted to execute an output layer of the neural network image identification program. The preset rules include: if a dimension of an input tensor of the input layer instruction graphic tag is higher than of a dimension of an output tensor of the output layer instruction graphic tag, then the combination sequence of instruction graphic tags must include at least one functional content graph of the flatten layer instruction graphic tag.

In one embodiment, the instruction graphic tag includes an input layer instruction graphic tag, a flatten layer instruction graphic tag, and a fully connected layer instruction graphic tag, with the input layer instruction graphic tag corresponding to an input layer program set, and the flatten layer instruction graphic tag corresponding to a flatten layer program set, and the fully connected layer instruction graphic tag corresponding to a fully connected layer program set, wherein the input layer program set is adapted to execute an input layer of the neural network image identification program, the flatten layer program set is adapted to execute a flatten layer of the neural network image identification program, and the fully connected layer program set is adapted to execute a fully connected layer of the neural network image identification program. The preset rules include: if a dimension of an input tensor of the input layer instruction graphic tag is higher than 1, then the functional content graph of the fully connected layer instruction graphic tag must be arranged after the functional content graph of the flatten layer instruction graphic tag.

In one embodiment, the neural network building method further comprises: if the user instructs to adjust the contents of the combination sequence of instruction graphic tags such that the combination sequence violates the preset rule, generating a warning signal and restoring the contents of the combination sequence of instruction graphic tags back to the contents of the combination sequence of instruction graphic tags before the preset rule is violated.

According to the above, by using the technology provided by the present disclosure, when a neural network program is to be produced, the user can have the corresponding neural network program generated by merely combining the instruction graphic tags, without actually writing with the programming language.

BRIEF DESCRIPTION OF THE DRAWINGS

FIG. 4A is a schematic diagram of contents of a combination sequence of instruction graphic tags according to an embodiment of the present disclosure.

FIG. 4B is a neural network program converted from the contents of the combination sequence of instruction graphic tags shown in FIG. 4A.

Figure 1:
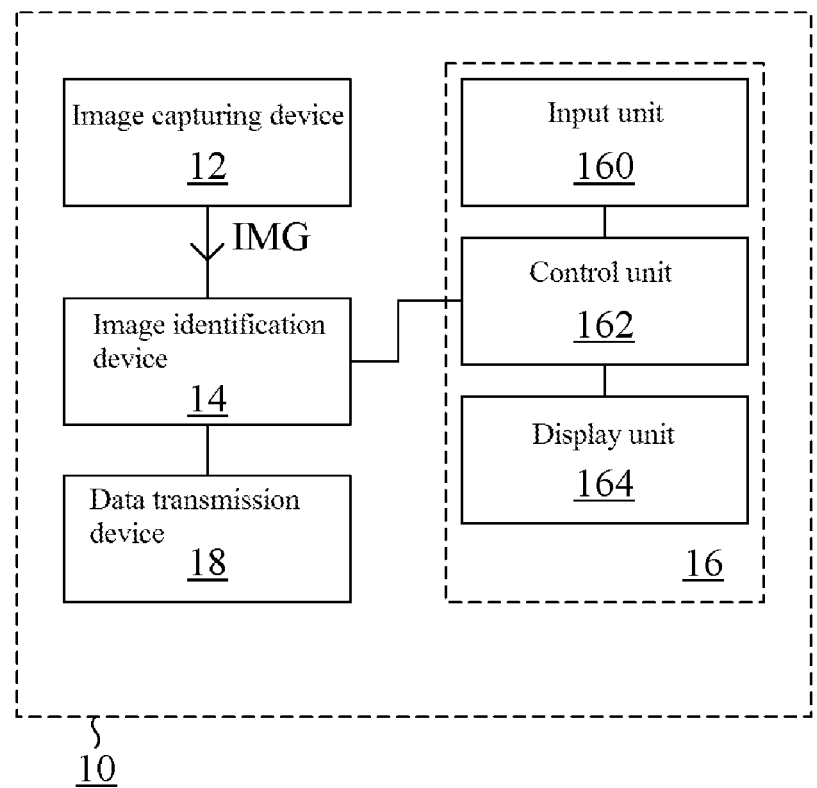
FIG. 1 is a block diagram of a neural network image identification system according to an embodiment of the present disclosure.

Wherein the numerical references in the drawings are:

10: neural network image identification system; 12: image capturing device; 14: image identification device; 16: neural network building system; 18: data transmission device; 20: screen; 22: instruction display area; 24: instruction combination area; 28: combination sequence of instruction graphic tags; 160: input unit; 162: control unit; 164: display unit; 220: instruction graphic tag 1; 222: instruction graphic tag 2; 224: instruction graphic tag 3; 226: instruction graphic tag 4; 240: sequence member 1; 242: sequence member 2; 244: sequence member 3; 246: sequence member 4; 248: sequence member 5; S502 to S508: steps of an embodiment of the present disclosure; IMG: image to be identified.

DETAILED DESCRIPTION

Please refer to FIG. 1, which is a block diagram of a neural network image identification system according to an embodiment of the present disclosure. In this embodiment, the neural network image identification system 10 includes an image capturing device 12, an image identification device 14, a neural network building system 16, a data transmission device 18, and a storage device (not shown). For example, the image capturing device 12 may be any type of camera, and is suitable for capturing images of various objects and generating a corresponding image to be identified IMG from the captured content. The image identification device 14 is, for example, a central processing unit (CPU), a graphics processing unit (GPU), or other general-purpose or dedicated programmable microprocessor, or a programmable logic device (PLD) or other similar devices or a combination thereof, but not limited thereto. The image identification device 14 is electrically coupled to the image capturing device 12 and obtains the image to be identified IMG generated from the image capturing device 12. The image capturing device 12 and the image identification device 14 may be coupled through a wired or wireless manner. In one embodiment, the image capturing device 12 may further have its own processor, storage device, etc., and is coupled to the image identification device 14 through a wireless manner (for example, Wi-Fi). After obtaining the image to be identified IMG the image identification device 14 may load and execute a neural network image identification program stored in the storage device, to apply an operation of image identification on the image to be identified IMG and report the identified result from the operation of image identification with any suitable method. The data transmission device 18 is electrically coupled to the image identification device 14 and can transmit data to or receive data from an external cloud server or edge server, or the like through any wired or wireless method, for example through a transmission interface such as a universal serial bus (USB), ethernet, bluetooth (BT), or wireless fidelity (Wi-Fi); the present embodiment is not limited thereto. The storage device may be, for example, any type of fixed or removable random access memory (RAM), read-only memory (ROM), flash memory, hard disk, or other similar components or a combination thereof, so as to store a program executable by the image identification device 14.

With different scenarios of use, the requirements by the user on the accuracy or identification speed of the neural network image identification program executed by the image identification device 14 may also vary. In the prior art, when it is desired to change the accuracy or identification speed of the neural network image identification program, the user has to obtain the corresponding neural network image identification program from the manufacturer. Once the manufacturer fails to provide a neural network image identification program with the appropriate accuracy or identification speed, the user may have to abandon the original hardware and turn to other image identification systems, resulting in a waste of time and money.

In order to improve the technologies in prior art, in the neural network image identification system 10 of this embodiment, there is also provided a neural network building system 16. As shown in FIG. 1, the neural network building system 16 includes an input unit 160, a control unit 162, and a display unit 164. The input unit 160 is adapted for a user to input a controlling operation, such as clicking or dragging, to generate control data corresponding to the controlling operation. The input unit 160 may be, for example, any type of input device, such as a keyboard, a mouse, or a touch device. The display unit 164 is adapted to provide a screen where a plurality of instruction graphic tags can be displayed; the display unit 164 may be any type of display such as a liquid crystal display, an organic light-emitting device, etc. The control unit 162 is coupled to the input unit 160, the display unit 164, and the image identification device 14; it provides program sets in which each corresponds to one of the instruction graphic tags. When the control data received by the control unit 162 instructs to adjust contents of a combination sequence of instruction graphic tags in the screen which is obtained from said instruction graphic tags, the control unit 162 adjusts the contents of said combination sequence of instruction graphic tags according to the received control data. In some embodiments, the control unit 162 may be hardware or software, such as a microprocessor or a microcontroller capable of executing a program, or a program stored in a storage device and executable by the image identification device 14.

In order to perform an operation of image identification on the image to be identified IMG through the neural network image identification system 10, the user may first select one or more target objects to be identified from an existing image, like an apple or a chair in the existing image, then build an appropriate neural network program through the neural network building system 16, and input the existing image containing the target object to be identified into the neural network for training the neural network, so that the trained neural network can then identify whether the target object is included in an image to be identified IMG Since the training of the neural network requires a large amount of computing resources, in one embodiment, after a neural network program has been built by the neural network image identification system 10, the neural network program and the existing image containing the target object to be identified may be transmitted through the data transmission device 18 remotely to an external cloud server or edge server, or the like for training. After the training, the trained neural network program is transmitted back to the neural network image identification system 10 through the data transmission device 18 for image identification. In some embodiments, the existing image containing the target object to be identified may be captured by the image capturing device 12 or downloaded from a network or an external database through the data transmission device 18. In some embodiments, before the training, the cloud server or the edge server may apply a variety of image processing, including clipping, scaling, rotation, etc, on the existing image containing the target object to be identified, and may also automatically provide a reference image which does not contain the target object to be identified as a reference for training the neural network. In another embodiment, the training of the neural network may also be performed by the local neural network image identification system 10. Although the present disclosure mainly describes the building of a neural network for image identification, those skilled in the art can understand that, the neural network building system 16 may also be applied to build neural networks for sound recognition, machine translation and the likes, with different neural network architectures and identification data.

Figure 2A:
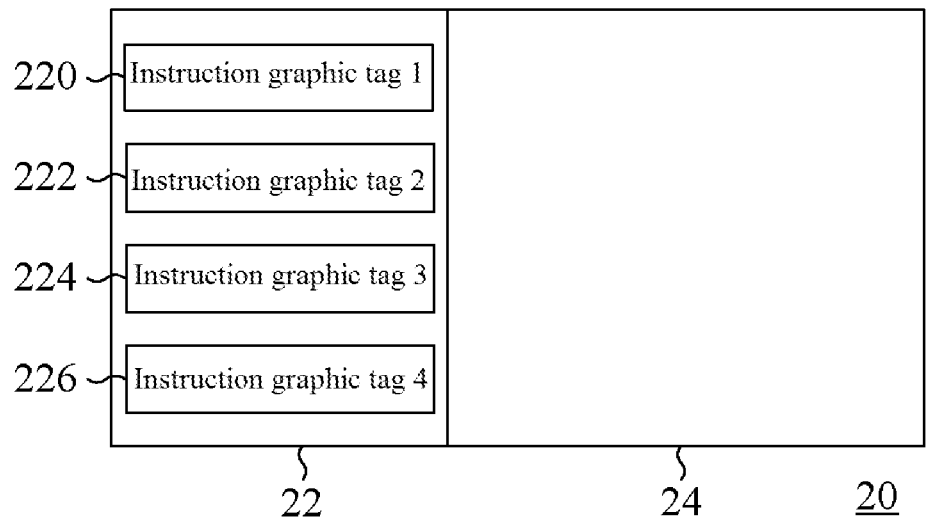
FIGS. 2A to 2E are schematic diagrams of screens provided by the display unit of the neural network building system according to an embodiment of the present disclosure.

In order to make the content of the above-mentioned technology easy to understand by those skilled in the art, now referring to FIGS. 2A to 2E, wherein FIGS. 2A to 2E are schematic diagrams of screens provided by the display unit 164 of the neural network building system 16 according to an embodiment of the present disclosure. As shown in FIGS. 2A to 2E, the screen 20 provided by the display unit 164 may include two areas, one of which is the instruction display area 22 and the other is the instruction combination area 24. In FIG. 2A, the neural network building system 16 starts to operate after initialization, so now the instruction graphic tag 1 220, the instruction graphic tag 2 222, the instruction graphic tag 3 224 and the instruction graphic tag 4 226 for selection by the user are displayed in the instruction display area 22 of the screen 20, with the instruction combination area 24 being blank at the start.

Figure 2B:
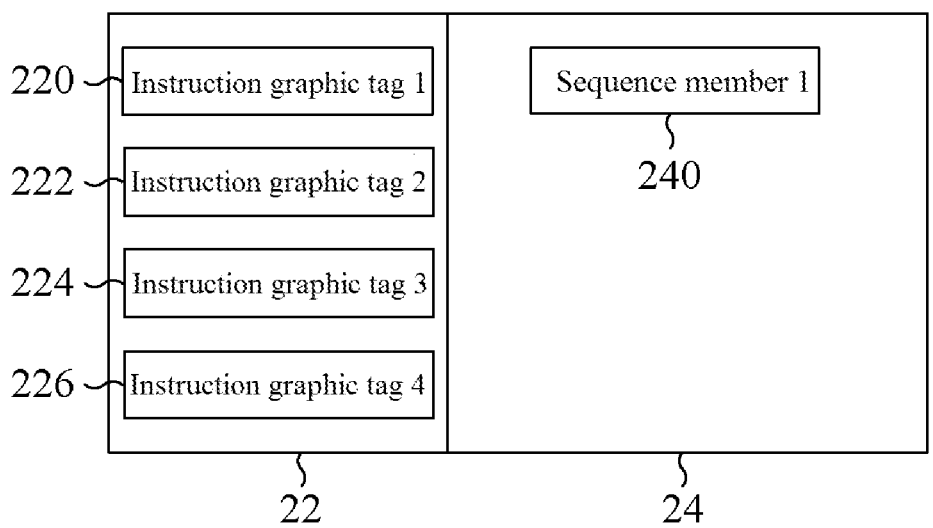

When writing a neural network image identification program, the user may do the writing work by combining the instruction graphic tags. Once the user selects any one of the instruction graphic tags displayed in the instruction display area 22, the functional content graph corresponding to the selected instruction graphic tag is displayed in the instruction combination area 24. As shown in FIG. 2B, if the user selects the instruction graphic tag 3 224, the functional content graph corresponding to the instruction graphic tag 3 224, which includes function descriptions, parameters to be input, and the likes, will be displayed in the instruction combination area 24 as a content of the sequence member 1 240.

Figure 2C:
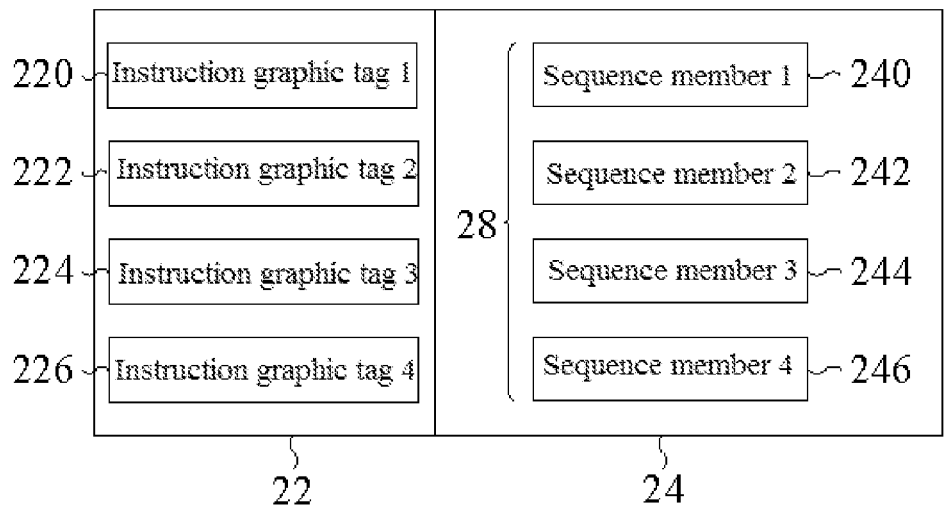

By selecting the instruction graphic tags multiple times, the functional content graphs corresponding to the selected instruction graphic tags will be sequentially arranged in the instruction combination area 24. As shown in FIG. 2C, if the user selects in sequence the instruction graphic tag 3 224, the instruction graphic tag 2 222, and the instruction graphic tag 4 226 twice, the functional content graphs corresponding to these instruction graphic tags will be displayed sequentially in the instruction combination area 24. That is, the functional content graph corresponding to the instruction graphic tag 3 224 will be the content of the sequence member 1 240, and the functional content graph corresponding to the instruction graphic tag 2 222 will be the content of the sequence member 2 242, and the functional content graph corresponding to the instruction graphic tag 4 226 will be the content of the sequence member 3 244 and that of the sequence member 4 246. The set constituted of these sequence members then becomes the combination sequence of instruction graphic tags 28 as mentioned above.

Figure 2D:
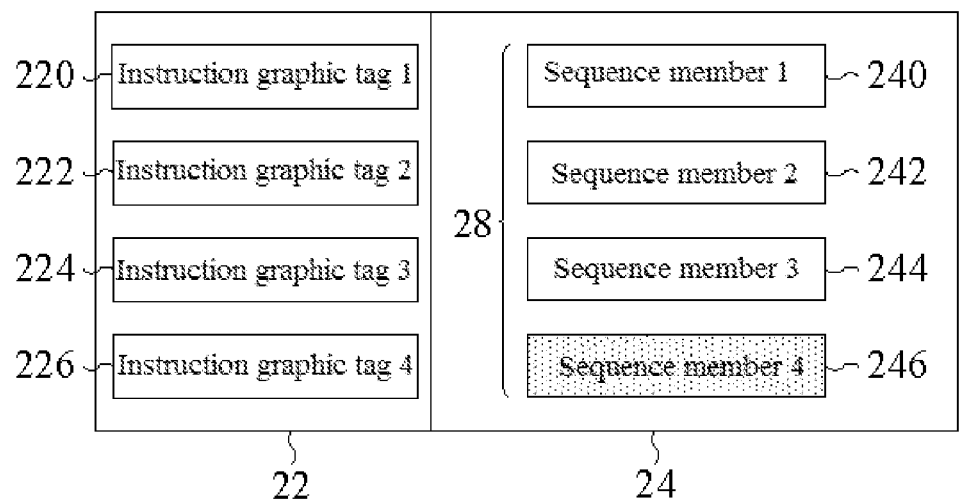
Figure 2E:
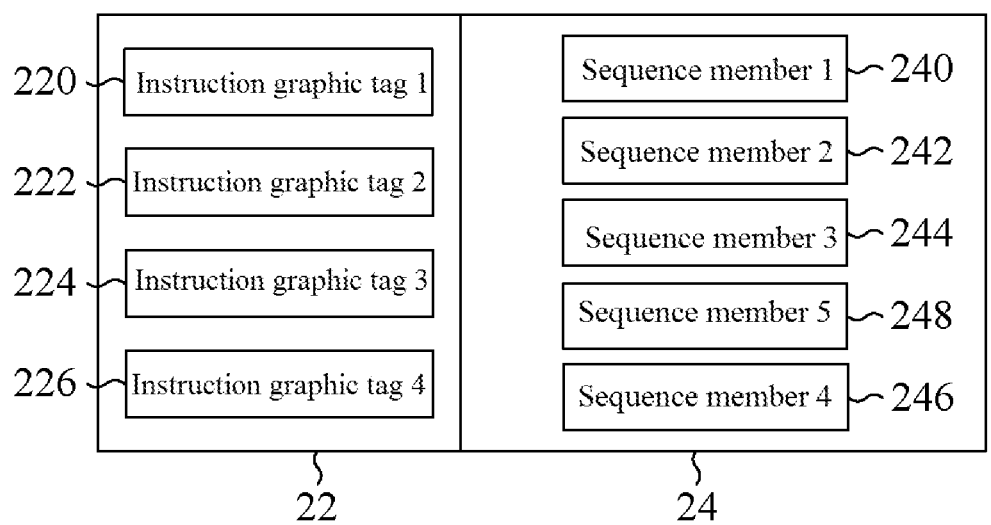

In a specific embodiment, the functional content graph corresponding to the latest selected instruction graphic tag by the user may be set to be added at the end of the combination sequence of instruction graphic tags; when the latest selected instruction graphic tag is to be added to other positions in the combination sequence of instruction graphic tags, the user may first select a specific sequence member and then select the instruction graphic tag to be added, so that the functional content graph corresponding to the selected instruction graphic tag may be added in front of the selected sequence member. For example, if the user first selects the sequence member 4 246 in the situation shown in FIG. 2C, the sequence member 4 246 will be presented in a different way (as shown in FIG. 2D); if afterwards the user selects the instruction graphic tag 1 220, then the functional content graph corresponding to the instruction graphic tag 1 220 will be inserted before the sequence member 4 246 and become the content of the sequence member 5 248, as shown in FIG. 2E.

In one embodiment, the instruction graphic tags and the functional content graphs corresponding to the instruction graphic tags are given in Table 1 as:

TABLE 1

| Name of instruction graphic tag | Functional content graph |
|---|---|
| Input layer | Input with x-size □ □ and y-size □ □ |
| Fully connected layer | Dense with □ □ units and □ □↓ activation |
| Flatten layer | Flatten |
| Convolution layer | Convolution with □ □ filters, kernel size □ □, □ □↓ padding and □ □↓ activation |
| Maxpooling layer | Maxpooling with x-size □ □ and y-size □ □ |
| Dropout layer | Dropout with rate □ □ |
| Output layer | Output with □ □ classes and □ □↓ activation | wherein, the text displayed in the functional content graphs may also be adjusted to other texts as desired, such as traditional Chinese or simplified Chinese. The position represented by the symbol □□ are fields used to fill in the necessary parameter by the user, and the down arrow symbol (↓) next to the symbol □□ represents a field in the form of a menu for the user to select an input value. These parameters or menus may be input by the user through the input unit 160, and the input content will be converted into corresponding control data and transmitted to the control unit 162 for subsequent use in building a neural network program.

In this embodiment, the input layer instruction graphic tag corresponds to the input layer program set in the control unit 162; the fully connected layer instruction graphic tag corresponds to the fully connected layer (dense layer) program set in the control unit 162; the flatten layer instruction graphic tag corresponds to the flatten layer program set in the control unit 162; the convolution layer instruction graphic tag corresponds to the convolution layer program set in the control unit 162; the maxpooling layer instruction graphic tag corresponds to the maxpooling layer program set in the control unit 162; the dropout layer instruction graphic tag corresponds to the dropout layer program set in the control unit 162; and the output layer instruction graphic tag corresponds to the output layer program set in the control unit 162. The input layer program set is adapted to execute the input layer of the neural network, which is the first layer of the neural network and is used to receive input data of a specific tensor size set in the corresponding functional content graph. In this embodiment for image identification, a dimension of the input tensor is preset to 3 and the size in the third dimension is preset to 3 to correspond to the RGB data of the image. However, in an embodiment of another scenario, it may be set to other values as required. The fully connected layer program set is adapted to execute the fully connected layer of the neural network. The fully connected layer has a function of classifying its input data, and in the corresponding functional content graph, the size of the output tensor (i.e., how many classes its input data is classified into) of this layer may be set and a menu may be used to select the activation function to be used, such as a rectified linear unit (ReLU) or a Sigmoid function. The flatten layer program set is adapted to execute the flatten layer of the neural network. The flatten layer needs no parameter to be filled in and is used to flatten input data with a tensor dimension higher than 1 into output data with a tensor dimension of 1. The convolution layer program set is adapted to execute a convolution layer of the neural network. The convolution layer has a function of classifying its input data into multiple feature maps, and in the corresponding functional content graph, the number of classes of features in the output of this layer and the size of the convolution kernel may be set, a menu may be used to select whether the input size and the output size should be consistent (that is, whether a padding is to be performed), and a menu may be used to select the activation function to be used. The maxpooling layer program set is adapted to execute the maxpooling layer of the neural network, which is used to output the maximum value among elements of each sub-matrix of input data with a specific size, where the size is set in the corresponding functional content graph. The dropout layer program set is adapted to execute the dropout layer of the neural network, which is used to randomly set a certain proportion of data from the input data to zero, where the proportion is set in the corresponding functional content graph. The output layer program set is adapted to execute the output layer of the neural network. The output layer is the last layer of the neural network, and in the corresponding functional content graph, the number of classes of the output result (equivalent to the size of the output tensor) may be set and a menu may be used to select the activation function to be used. The types of instruction graphic tags and corresponding neural network layers are not limited to these, and the layers may include a reshape layer that adjusts the input data to a specific size and a masking layer that masks specific input data among others.

Next, once the user has completed the selection and combination of the instruction graphic tags and requests to generate the corresponding program content, this request to generate the corresponding program content will be converted into corresponding control data for controlling the control unit 162 to combine program sets corresponding to these instruction graphic tags in an order identical to that of the contents in the existing combination sequence of instruction graphic tags to generate a neural network program (for example, but not limited to, a neural network program written in the programming language of Python). In another embodiment, when the user selects the instruction graphic tags one by one, the control unit 162 may also sequentially combine the program sets corresponding to these instruction graphic tags concurrently, in order to generate a neural network program step by step.

Figures 3A, 3B:
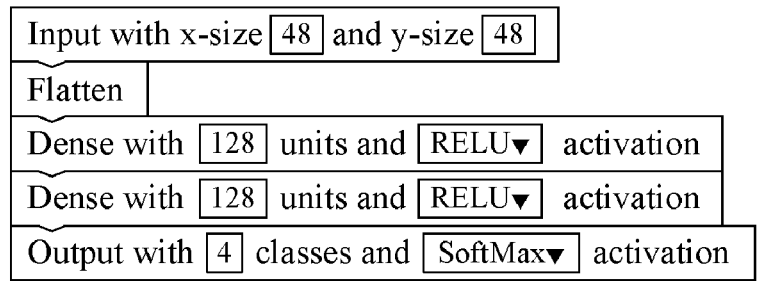
FIG. 3A is a schematic diagram of contents of a combination sequence of instruction graphic tags according to an embodiment of the present disclosure.
FIG. 3B is a neural network program converted from the contents of the combination sequence of instruction graphic tags shown in FIG. 3A.

Taking the commonly used object-oriented programming language Python as an example, the user may select sequentially the input layer instruction graphic tag, the flatten layer instruction graphic tag, the fully connected layer instruction graphic tag, the fully connected layer instruction graphic tag, and the output layer instruction graphic tag, and input the desired parameters in the fields for parameter input or selection in the corresponding functional content graphs, so as to obtain the combination sequence of instruction graphic tags shown in FIG. 3A. Then, the user may request the combination sequence of instruction graphic tags in FIG. 3A to be converted into the neural network program; the control unit 162 in turn will combine the corresponding program sets (the input layer program set, the flatten layer program set, the fully connected layer program set, the fully connected layer program set, and the output layer program set, sequentially) according to the contents in the combination sequence of instruction graphic tags to obtain the neural network program shown in FIG. 3B.

In a further embodiment, again, taking the commonly used object-oriented programming language Python as an example, after the user selects the instruction graphic tags to generate functional content graphs sequentially corresponding to an input layer instruction graphic tag, two consecutive convolution layer instruction graphic tags, a maxpooling layer instruction graphic tag, a dropout instruction graphic tag, a flatten layer instruction graphic tag, a fully connected layer instruction graphic tag, a dropout layer instruction graphic tag, an output layer instruction graphic tag, and inputs the appropriate parameter values, he/she will find the combination sequence of instruction graphic tags as shown in FIG. 4A in the instruction combination area of the screen. This combination sequence of instruction graphic tags may be converted into the neural network program shown in FIG. 4B.

According to the above, the user only has to know which layers in the neural network are desired to be used to form the neural network image identification program, the corresponding neural network program can be generated by simply selecting the respective instruction graphic tags sequentially and inputting essential parameters. As the user only needs to combine the instruction graphic tags rather than actually writing the program in the programming language, errors in the program writing, such as typos or errors in program syntax, can be avoided. These errors during the writing of the program cannot be discovered until the compiling of the programming language by a compiler, and further corrections and re-compiling would be required. When the compiler converts the original program codes written in the programming language into a program (executable file) of an executable low-level machine language, the original program codes would be subjected to a lexical analysis, a syntax analysis, a semantic analysis, and the likes, to verify that the program conforms to a type system. Therefore, if the above errors in program writing can be avoided in advance by the use of the instruction graphic tags, the efficiency of program compiling can be improved and the waste of computing resources can be avoided.

Furthermore, the control unit 162 may also check, according to one or more preset rules, whether the control data for adjusting the contents in the combination sequence of instruction graphic tags input by the user can generate a proper neural network program. These preset rules are used to check whether the matching relationship between the neural network layers in the neural network program corresponding to the combination sequence of instruction graphic tags is appropriate, including the order of the neural network layers, and whether the size or dimension of the inputs and outputs of respective neural network layers line up with each other properly. These preset rules may include, but are not limited to: (1) the functional content graph corresponding to the input layer instruction graphic tag must be arranged as the first one in the combination sequence of instruction graphic tags, and there is only one functional content graph corresponding to the input layer instruction graphic tag; (2) the functional content graph corresponding to the output layer instruction graphic tag must be arranged as the last one in the combination sequence of instruction graphic tags, and there is only one functional content graph corresponding to the output layer instruction graphic tag; (3) if the dimension of the input tensor of the input layer instruction graphic tag is higher than the dimension of the output tensor of the output layer instruction graphic tag, then there must be at least one functional content graph corresponding to the flatten layer instruction graphic tag in the combination sequence of instruction graphic tags; (4) if the dimension of the input tensor of the input layer instruction graphic tag is higher than 1, then the functional content graph corresponding to the fully connected layer instruction graphic tag must be arranged after the functional content graph corresponding to the flatten layer instruction graphic tag; and (5) the functional content graphs corresponding to the convolution layer instruction graphic tag and the maxpooling layer instruction graphic tag cannot be arranged after the functional content graph corresponding to the flatten layer instruction graphic tag.

In an embodiment, once the change of the contents in the combination sequence of instruction graphic tags caused by the control data input by the user violates any one of the above-mentioned preset rules, the control unit 162 may inform the user that the manner of adjusting the contents in the combination sequence of instruction graphic tags instructed by this control data is incorrect, by generating a warning signal (such as a warning sound or an error message displayed on the screen). In addition, in an embodiment, the control unit 162 may also automatically control the display unit 164 to restore the contents in the combination sequence of instruction graphic tags in the screen back to the contents before the change by this control data that violates the preset rules. For example, if the manner of adding the sequence member 5 248 as previously shown in FIG. 2E violates a preset rule, the control unit 162 may turn the contents in the combination sequence of instruction graphic tags back to the contents as shown in FIG. 2D or FIG. 2C. In another embodiment, the control unit 162 may be notified (for example, via the input unit 160) to check whether a combination sequence of instruction graphic tags meets the preset rules, after that combination sequence of instruction graphic tags has been fully completed by the user. The above-mentioned check with the preset rules may be performed before or after the generation of a corresponding neural network program from the combination sequence of instruction graphic tags. By checking on the instruction graphic tags with the preset rules, more possible program errors can be corrected before the neural network program is sent to the compiler for compilation, which further improves the efficiency of program compilation.

In one embodiment, after the combination sequence of instruction graphic tags is completed and the preset rules are checked, the user may request that the combination sequence of instruction graphic tags to be converted into a corresponding neural network program, and that the neural network program to be compiled and trained as described in above. In one embodiment, the compilation and training of the neural network program may be performed by the neural network image identification system 10. In another embodiment, the neural network program may be transmitted to an external cloud server or edge server, or the like via the data transmission device 18 for compilation and training; and after training, the trained neural network program may be transmitted back to the neural network image identification system 10 via the data transmission device 18. In yet another embodiment, the compilation and training of the neural network program may also be performed in different systems. For example, the compilation of the neural network program is performed by the neural network image identification system 10, while the training of the neural network program is performed by, among others, an external cloud server or edge server, or vice versa. Related parameters for training the neural network program, such as the target accuracy of training and the training time, may be set by the user through the input unit 160.

Figure 5:
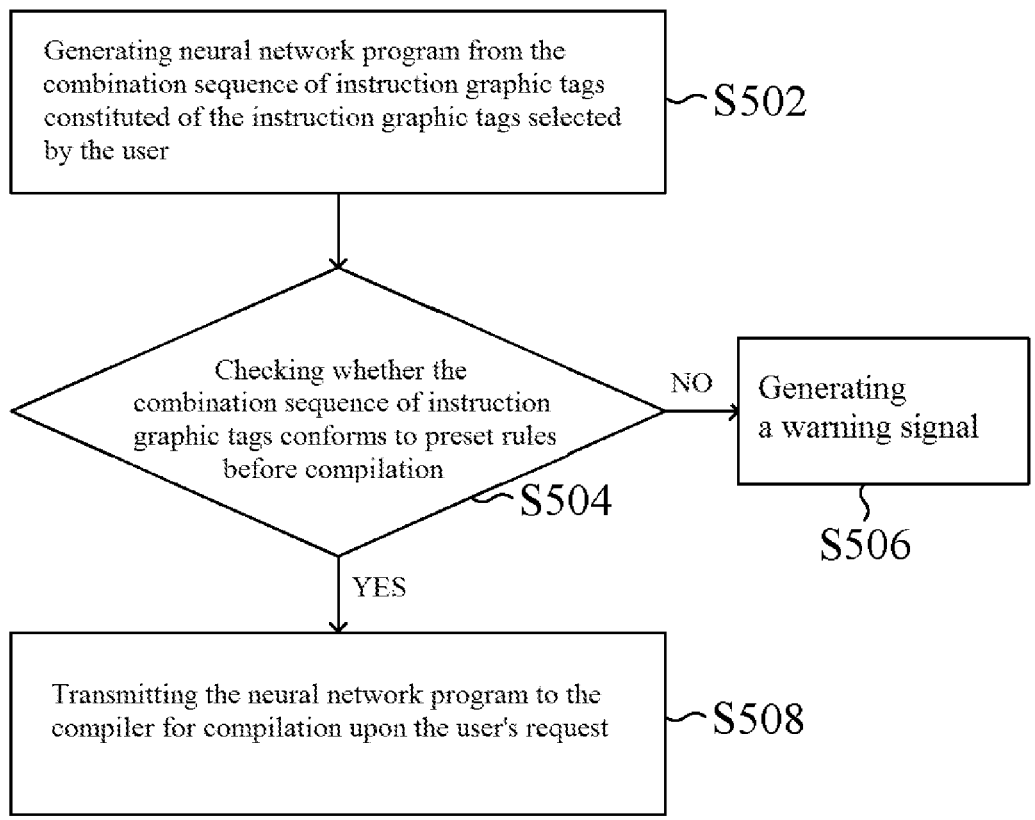
FIG. 5 is a flowchart of a neural network building method according to an embodiment of the present disclosure.

FIG. 5 is a flowchart of a method for neural network building according to an embodiment of the present disclosure. The method in the embodiment is applicable to the above-mentioned neural network building system 16. In step S502, the neural network building system 16 displays in the screen a plurality of instruction graphic tags to be combined by the user, wherein the instruction graphic tags correspond to different program sets for neural network layers respectively; and the neural network building system 16 generates a neural network program from the combination sequence of instruction graphic tags constituted of the instruction graphic tags selected by the user. In step S504, the neural network building system 16 checks whether the combination sequence of instruction graphic tags conforms to one or more preset rules before transmitting the neural network program to the compiler for compilation. As described above, in another embodiment, the corresponding neural network program may also be generated from the combination sequence of instruction graphic tags after checking with the preset rules. If the combination sequence of instruction graphic tags violates at least one preset rule (step S504: NO), a warning signal may be generated (step S506) to remind the user to modify the combination sequence of instruction graphic tags, or the combination sequence of instruction graphic tags may be modified automatically by the neural network building system 16, so as to conform to the preset rules. In one embodiment, after being modified by the user or automatically modified by the neural network building system 16, the modified combination sequence of instruction graphic tags may be checked again for its conformation with the one or more preset rules. If the combination sequence of instruction graphic tags conforms with all preset rules (step S504: YES), and the user requests to compile the neural network program corresponding to the combination sequence of instruction graphic tags, the neural network program is transmitted to the compiler for compilation (step S508), wherein the neural network program may be compiled locally (for example, by the neural network image identification system 10) or transmitted to a remote end (for example, an external cloud server or edge server, or the like) for compilation. After the neural network program is compiled, training of the neural network program may be further performed locally or at the remote end.

In summary, with the technical solution provided in the present disclosure, when a neural network program is to be produced, the user may have the corresponding neural network program generated by merely combining instruction graphic tags, rather than actually writing with a programming language. Therefore, the user does not need to learn the particular method of writing in that programming language, which reduces the threshold for self-made neural network programs. Furthermore, the present disclosure can preliminarily exclude the combination sequences of instruction graphic tags that do not conform with the preset rules, therefore reducing the probability of errors in program compilation.

The preferred embodiments as given above do not intend to limit the scope of the present disclosure. On this basis, a number of variations and modifications may occur to one skilled in the art without departing from the scopes and spirits of the described disclosure. The protection scope of the present disclosure shall be subject to the scope defined by the following claims.

The invention claimed is:

1. A neural network image identification system, comprising:
   an image capturing device, capturing an image to be identified;
   an image identification device electrically coupled to the image capturing device, obtaining the image to be identified from the image capturing device, and executing a neural network image identification program to identify the image to be identified to obtain a result of identification; and
   a neural network building system, including:
   a display unit, providing a screen for displaying a plurality of instruction graphic tags;
   an input unit for a user to input a controlling operation to select the plurality of instruction graphic tags, to form a combination sequence of instruction graphic tags; and
   a control unit, providing a plurality of program sets related to a plurality of neural network layers, with each of the plurality of instruction graphic tags corresponding to one of the plurality of program sets,
   wherein the neural network building system combines, in an order identical to that of the contents of the combination sequence of instruction graphic tags, the plurality of program sets corresponding to the plurality of instruction graphic tags to generate the neural network image identification program;
   wherein the neural network building system checks whether the combination sequence of instruction graphic tags conforms with one or more preset rules before the neural network image identification program is compiled; and
   wherein the plurality of instruction graphic tags includes an input layer instruction graphic tag, a flatten layer instruction graphic tag, and a fully connected layer instruction graphic tag, with the input layer instruction graphic tag corresponding to an input layer program set, and the flatten layer instruction graphic tag corresponding to a flatten layer program set, and the fully connected layer instruction graphic tag corresponding to a fully connected layer program set, wherein the input layer program set is adapted to execute an input layer of the neural network image identification program, the flatten layer program set is adapted to execute a flatten layer of the neural network image identification program, and the fully connected layer program set is adapted to execute a fully connected layer of the neural network image identification program; wherein the preset rules include:
   if a dimension of an input tensor of the input layer instruction graphic tag is higher than 1, then a functional content graph of the fully connected layer instruction graphic tag must be arranged after the functional content graph of the flatten layer instruction graphic tag.

2. The neural network image identification system according to claim 1, wherein the controlling operation includes setting a parameter field in a functional content graph corresponding to the instruction graphic tag to set a parameter used by the program set corresponding to the instruction graphic tag.

3. The neural network image identification system according to claim 1, wherein the one or more preset rules are used to check whether a matching relationship between the plurality of program sets corresponding to the plurality of instruction graphic tags in the combination sequence of instruction graphic tags is appropriate.

4. The neural network image identification system according to claim 1, wherein the plurality of instruction graphic tags includes an input layer instruction graphic tag, a flatten layer instruction graphic tag, and an output layer instruction graphic tag, with the input layer instruction graphic tag corresponding to an input layer program set, and the flatten layer instruction graphic tag corresponding to a flatten layer program set, and the output layer instruction graphic tag corresponding to an output layer program set, wherein the input layer program set is adapted to execute an input layer of the neural network image identification program, the flatten layer program set is adapted to execute a flatten layer of the neural network image identification program, and the output layer program set is adapted to execute an output layer of the neural network image identification program, wherein the preset rules includes:
   if a dimension of an input tensor of the input layer instruction graphic tag is higher than a dimension of an output tensor of the output layer instruction graphic tag, then the combination sequence of instruction graphic tags must include at least one functional content graph of the flatten layer instruction graphic tag.

5. The neural network image identification system according to claim 1, wherein if the controlling operation to adjust the contents of the combination sequence of instruction graphic tags violates the preset rules, the neural network building system generates a warning signal and restores the contents of the combination sequence of instruction graphic tags back to the contents of the combination sequence of instruction graphic tags before execution of the controlling operation.

6. The neural network image identification system according to claim 1, wherein when the neural network building system has finished the check with the preset rules, the neural network image identification system transmits the neural network image identification program to an external server for compilation, and transmits an existing image including a target object to be identified to the external server for training the neural network image identification program, wherein the external server provides a reference image that does not include the target object for training the neural network image identification program, and after the training is finished, the neural network image identification program is transmitted back to the neural network image identification system for identifying whether the image to be identified contains the target object.

7. A method executed by a processor circuit for neural network image identification, comprising:
   forming a combination sequence of instruction graphic tags according to a plurality of instruction graphic tags, which are displayed on a screen, selected by a user;
   combining a plurality of program sets corresponding to the plurality of instruction graphic tags in an order identical to that of the contents of the combination sequence of instruction graphic tags, to generate a neural network image identification program;
   checking whether the combination sequence of instruction graphic tags conforms to one or more preset rules before the neural network image identification program is compiled;
   capturing an image to be identified; and
   executing the neural network image identification program to identify the image to be identified to obtain a result of identification,
   wherein the plurality of instruction graphic tags includes an input layer instruction graphic tag, a flatten layer instruction graphic tag, and a fully connected layer instruction graphic tag, with the input layer instruction graphic tag corresponding to an input layer program set, and the flatten layer instruction graphic tag corresponding to a flatten layer program set, and the fully connected layer instruction graphic tag corresponding to a fully connected layer program set, wherein the input layer program set is adapted to execute an input layer of the neural network program, the flatten layer program set is adapted to execute a flatten layer of the neural network program, and the fully connected layer program set is adapted to execute a fully connected layer of the neural network program; wherein the preset rules include:

if a dimension of an input tensor of the input layer instruction graphic tag is higher than 1, then the functional content graph of the fully connected layer instruction graphic tag must be arranged after the functional content graph of the flatten layer instruction graphic tag.

8. The method according to claim 7, further comprising: setting a parameter used by the program set corresponding to the instruction graphic tag according to a parameter field set by a user in a functional content graph corresponding to the instruction graphic tag.

9. The method according to claim 7, wherein the one or more preset rules are used to check whether a matching relationship between the plurality of program sets corresponding to the plurality of instruction graphic tags in the combination sequence of instruction graphic tags is appropriate.

10. The method according to claim 7, wherein the plurality of instruction graphic tags includes an input layer instruction graphic tag, a flatten layer instruction graphic tag, and an output layer instruction graphic tag, with the input layer instruction graphic tag corresponding to an input layer program set, and the flatten layer instruction graphic tag corresponding to a flatten layer program set, and the output layer instruction graphic tag corresponding to an output layer program set, wherein the input layer program set is adapted to execute an input layer of the neural network program, the flatten layer program set is adapted to execute a flatten layer of the neural network program, and the output layer program set is adapted to execute an output layer of the neural network program, wherein the preset rules includes:

if a dimension of an input tensor of the input layer instruction graphic tag is higher than a dimension of an output tensor of the output layer instruction graphic tag, then the combination sequence of instruction graphic tags must include at least one functional content graph of the flatten layer instruction graphic tag.

11. The method according to claim 7, further comprising:

if a user instructs to adjust the contents of the combination sequence of instruction graphic tags such that the combination sequence violates the preset rules, generating a warning signal and restoring the contents of the combination sequence of instruction graphic tags back to the contents of the combination sequence of instruction graphic tags before the preset rules were violated.

* * * * *